United States Patent [19]

Laine

[11] Patent Number: 4,746,911

[45] Date of Patent: May 24, 1988

[54] ALARM DEVICE FOR ISOLATED PIPE SYSTEMS

[75] Inventor: Allan Laine, Lulea, Sweden

[73] Assignee: Rune Helmersson, Umea, Sweden

[21] Appl. No.: 70,618

[22] Filed: Jul. 9, 1987

Related U.S. Application Data

[63] Continuation of Ser. No. 649,670, Sep. 12, 1984, abandoned.

[30] Foreign Application Priority Data

Dec. 8, 1983 [SE] Sweden .................................. 8306789

[51] Int. Cl.$^4$ ............................................. G08B 21/00
[52] U.S. Cl. .................................... 340/605; 340/647; 174/11 R
[58] Field of Search ............... 340/602, 603, 604, 605, 340/647, 649, 650; 324/51, 54; 200/61.04; 174/11 R

[56] References Cited

U.S. PATENT DOCUMENTS

| | | | |
|---|---|---|---|
| 1,919,802 | 7/1933 | Pfeiffer | 340/647 X |
| 2,422,288 | 6/1947 | Boynton | 340/647 X |
| 2,759,175 | 8/1956 | Spalding | 200/61.04 |
| 3,648,282 | 3/1972 | Kelly | 340/647 |
| 3,731,295 | 5/1973 | Van Luyn | 174/11 R X |
| 3,869,665 | 3/1975 | Kenmochi et al. | 174/11 R |
| 4,013,924 | 3/1977 | Christensen et al. | 340/602 X |
| 4,157,541 | 6/1979 | Harwell | 340/650 X |
| 4,288,653 | 9/1981 | Blom et al. | 340/605 X |
| 4,422,034 | 12/1983 | Matsuno et al. | 324/51 |

FOREIGN PATENT DOCUMENTS 1455415  11/1976  United Kingdom ................. 340/605

Primary Examiner—Joseph A. Orsino
Assistant Examiner—Jeffery A. Hofsass

[57] ABSTRACT

This invention relates to an alarm device for isolated pipe systems. The alarm device in accordance with the invention is characterized in that a transformer device (TR1) arranged to supply a signal from an oscillator (1) across a connection element (2) is connected across a connection point (7) to a media tube (9) surrounded by insulation (10) along which an alarm wire (8) is applied and, in the event of a change in the insulation of the media tube, is arranged to affect the signal in the connection element (2) via transformer device (TR1) and to sense this in a level sensing device (3), the output signal of which is applied for reference in a comparator device (4), whereby an alarm is arranged to be initiated at a level dependent on the resistance of the insulation (10) and a transformer device (TR2) is arranged for connection in series with the transformer device (TR1) via the alarm wire (8), so that part of the signal to the connection element (2) is applied for sensing in a level sensing device (5), the output signal of which is arranged to be applied for reference in a comparator device (6), and an alarm is then arranged to be initiated at a level dependent on the resistance in the alarm wire (8), the alarm wire (8) and the media tube (9) being galvanically separated from other measuring equipment and the alarm wire (8) being preferably in the form of a coil incorporated into the insulation (10) and surrounded by the media tube (9).

2 Claims, 1 Drawing Sheet

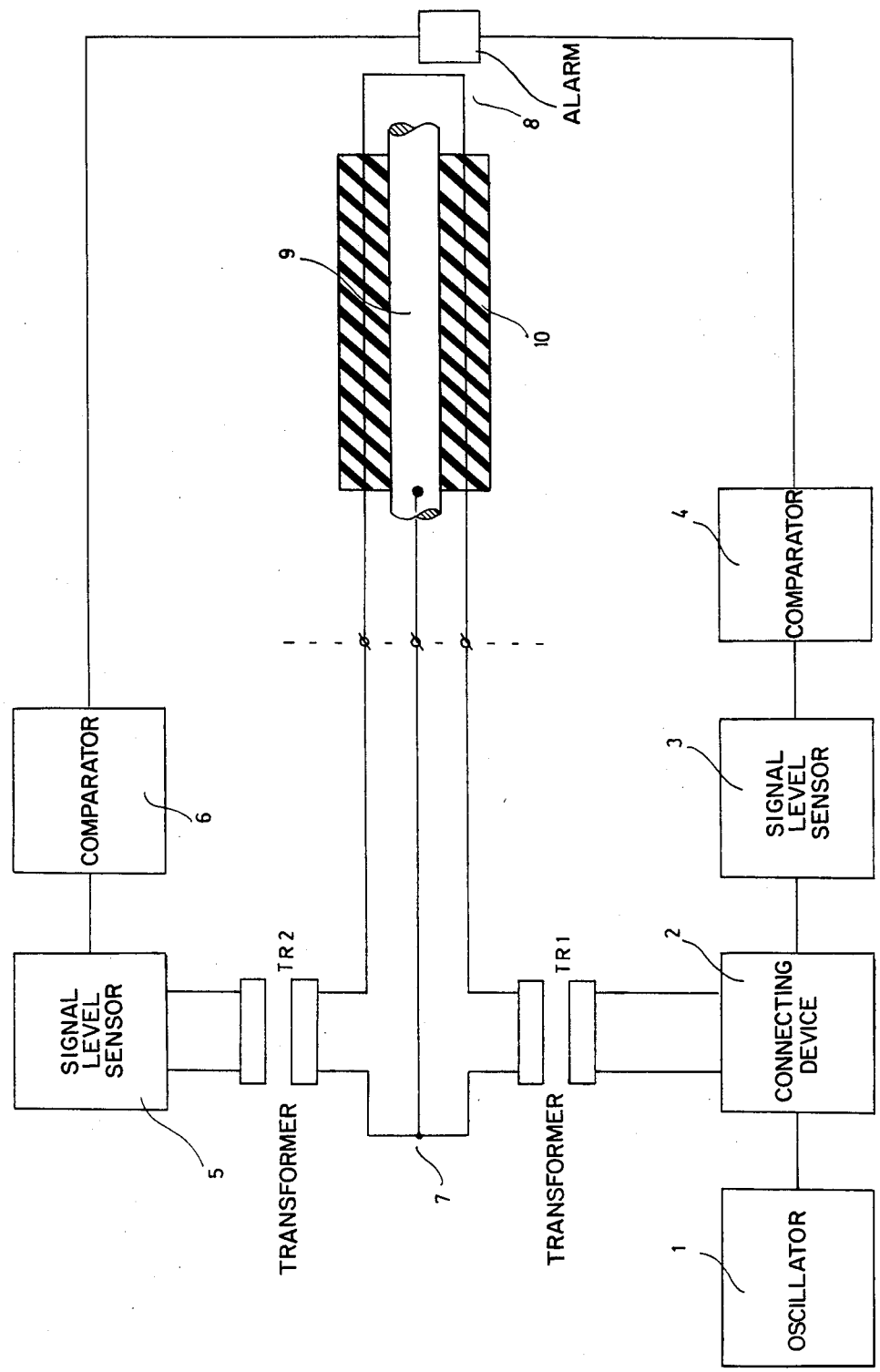

ALARM DEVICE FOR ISOLATED PIPE SYSTEMS

This application is a continuation of application Ser. No. 649,670, filed Sept. 12, 1984, now abandoned.

This invention relates to an alarm device for insulated pipe systems.

Various alarm devices for pipe systems are already known, such as a device disclosed in Swedish Patent Application No. 405,286. However, the are technically complicated and expensive.

The invention will now be described in more detail, referring to the appended FIGURE which shows the alarm device in accordance with the invention.

The FIGURE shows an oscillator 1, operating at a frequency $f_o$ that differs from the mains frequency, which supplies a connection element 2 which in turn supplies a signal with the frequency $f_o$ to a transformer TR1 which supplies an alarm wire 8 in a pipe 9. In the event of a short-circuit in insulation 10 because of a leak in pipe 9, the load on transformer TR1 will change, the transformer being connected across a connection point 7 to the pipe 9. This change affects the signal level in the connection element 2 and is sensed by a signal level detector 3. The output signal from the level detector is compared with a reference level in a comparator 4 and an alarm will be initiated at a level determined by the resistance in insulation 10. A transformer TR2 is connected in series with transformer TR1 across the alarm wire 8, so that part of the signal will be connected to a level sensor 5 in such a manner that if the resistance in the alarm wire 8, which may be in the form of a loop, for instance, exceeds predetermined value, the signal to a comparator 6 will assume such a value that an alarm will be initiated. The device is designed in such a manner that alarm wire 8 and pipe 9 are galvanically separated from the above-mentioned measuring equipment, and no earth currents can therefore occur. This is particularly important if several units are interconnected in a large network, with signal transmission and a remote power supply.

The invention is obviously not confined to this design but can be varied within the scope of the principle behind the invention.

I claim:

1. A device for issuing an alarm in a carrier pipe which is surrounded by insulation having a predetermined resistance upon a change in resistance, comprising: an alarm wire having a predetermined resistance and extending along said pipe in said insulation, oscillator means, first transformer means, connecting means having an input connected to said oscillator means and an output to said first transformer means, said first transformer means being connected to said pipe for supplying a signal thereto from said connecting means, first signal lever sensor means connected to an output of said connecting means, first comparator means connected to said first signal lever sensor means, second transformer means arranged in series with said first transformer means via said wire, second signal level sensor means connected to said second transformer means, and second comparator means connected to said second signal level sensor means, said wire and said pipe being galvanically separated from other measuring equipment, whereby a change in the resistance of the insulation will change the output from said connecting means being supplied to said first signal level sensor means and compared in said first comparator means with a reference signal level, and part of the input signal to said connecting means being supplied to said second signal level sensor means and compared in said second comparator means with a reference signal level, whereby an alarm will be issued.

2. A device according to claim 1, wherein said wire forms a loop in said insulation.

* * * * *